ACTIVE DELAY EQUALIZER CIRCUIT
Filed Oct. 7, 1968 2 Sheets-Sheet 1
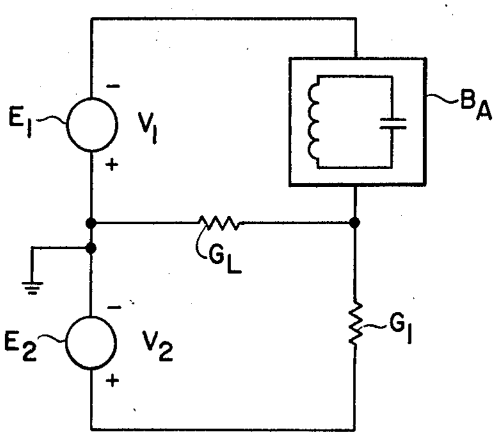
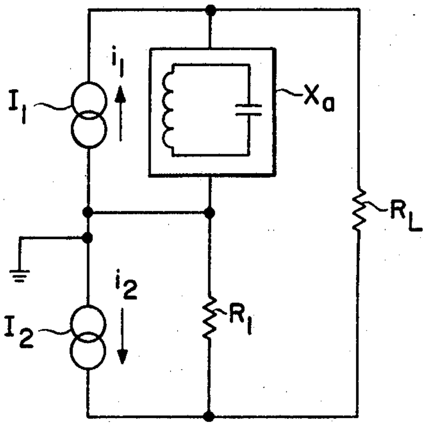
PRIOR ART
Fig.-1 Fig.-2
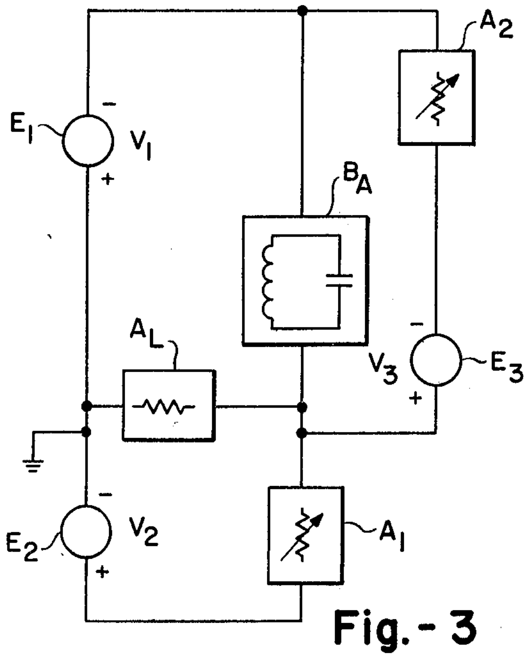
Fig.-3
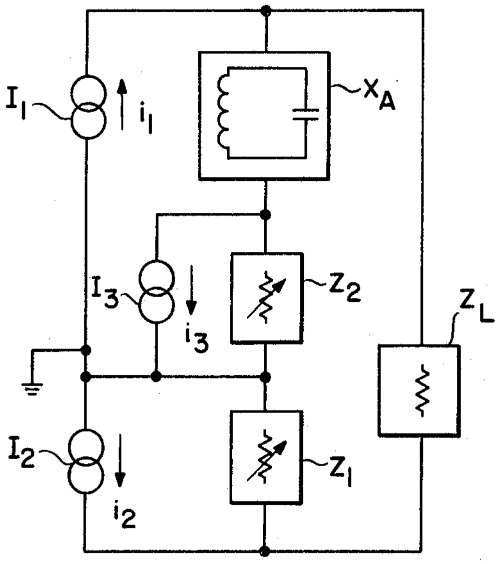
Fig.-4
INVENTOR
FREDERICK T. HALSEY
BY Curphey & Erickson
PATENT AGENTS INVENTOR
FREDERICK T. HALSEY
BY Curphey & Erickson
PATENT AGENTS

United States Patent Office 3,509,481

Patented Apr. 28, 1970

3,509,481

ACTIVE DELAY EQUALIZER CIRCUIT

Frederick T. Halsey, Ottawa, Ontario, Canada, assignor to Northern Electric Company Limited, Montreal, Quebec, Canada

Filed Oct. 7, 1968, Ser. No. 765,311
Int. Cl. H03f *3/68;* H03h *5/00*
U.S. Cl. 330—30 6 Claims

ABSTRACT OF THE DISCLOSURE

An active delay equalizer circuit in which the phase delay may be varied by adjusting a single resistor with virtually no affect on the all-pass amplitude response.

This invention relates to an active delay equalizer circuit and more particularly to such a circuit in which the phase delay may be varied by adjusting a single resistor with virtually no affect on the all-pass amplitude response.

In high performance transmission systems, it is usually necessary to adjust both the amplitude response and phase delay across the pass band in order to compensate for degradation introduced during transmission of the signal. This entails inserting one or more networks in the transmission path having a compensating characteristic. Ideally, the phase correction network should be all-pass with a flat frequency response and also have a variable delay characteristic which can be adjusted by a single parameter for any operating condition of the transmission system.

In the past, various approaches have been made to overcome this latter problem. They have, however, been plagued with attendant problems such as being too complex or giving rise to too large a variation in amplitude response as the phase delay is changed. One such approach which uses an active delay equalizer has been described in "An Active Network Equivalent to the Constant-Resistance Lattice with Delay Circuit Applications" by R. W. Calfee; IEEE Transactions on Circuit Theory, December 1963, pages 532 and 533. Calfee has shown that if the reactances are lossless and the load draws no power, the circuit can be made all-pass. However, as the magnitude of any such imperfection increases, the circuit will depart from a flat amplitude response. It can be shown that such variations may be overcome, for any given phase delay, by controlling the relative phase and amplitude of the generators. The amplitude response would however, still degrade as the phase delay is varied. Thus, the circuit illustrated therein and its current equivalent do not lend themselves to variable delay applications with a single adjustment without appreciably affecting the amplitude response. With high quality transmission systems, such amplitude variations are intolerable and hence another solution must be found.

The present invention is an improvement over the above-mentioned Calfee circuit and provides that the signal source be divided into three rather than two voltage or current generators. With the correct phase relationship and amplitude division of the sources, it is possible to change the phase delay of the network over a wide range with virtually no change in amplitude response, by varying a single resistive element. While the present invention is equally applicable to circuits in which the signal sources are either current or voltage sources, it particularly lends itself to the former when utilizing transistors as the active elements.

Example embodiments of the invention will now be described with reference to the accompanying drawings in which:

FIGURE 1 is a circuit diagram of a prior art active delay equalizer circuit utilizing voltage sources;

FIGURE 2 is a circuit diagram of the current equivalent of the voltage delay equalizer circuit shown in FIGURE 1;

FIGURE 3 is a circuit diagram of an active delay equalizer circuit utilizing voltage sources in accordance with the present invention;

FIGURE 4 is a circuit diagram of the current equivalent of the circuit shown in FIGURE 3 also in accordance with the present invention;

Figure 5:
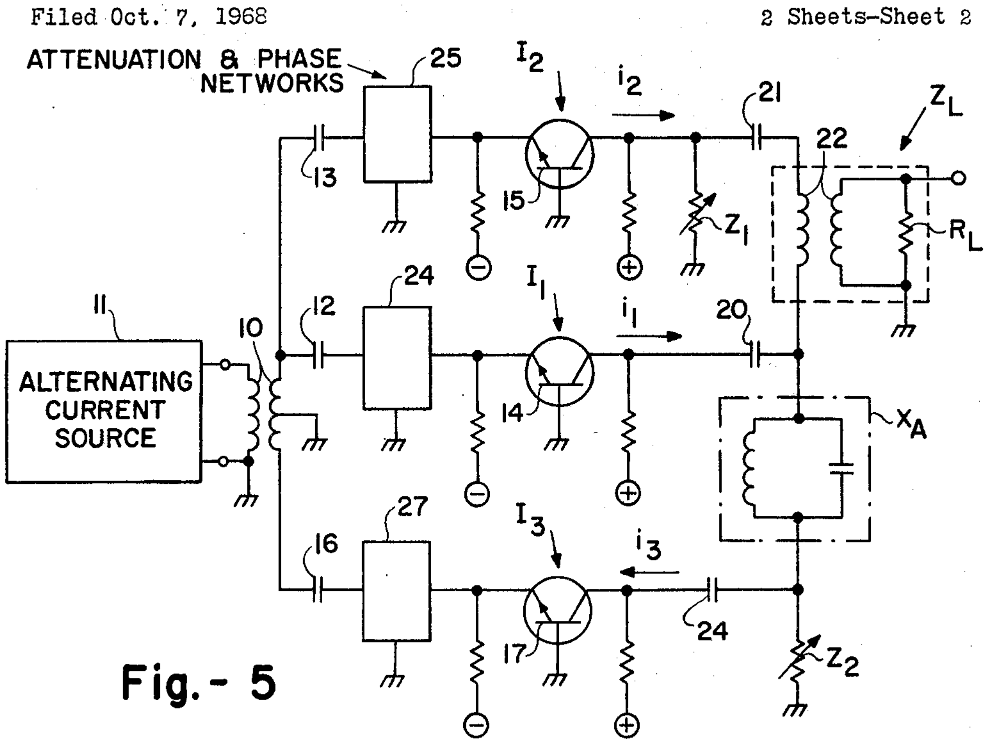
FIGURE 5 is a schematic circuit diagram of the active delay equalizer circuit shown in FIGURE 4.

In the following description, the passive components of the circuits utilizing voltage sources will be designated as conductances, susceptances or admittances, while those utilizing current sources will be designated as resistances, reactances or impedances. It will be understood that those components having the same subscript are equivalents although they may not necessarily have the same value.

In FIGURE 1, which illustrates a simplified schematic diagram of the prior art equalizer shown in the article by Calfee mentioned above, there is shown two voltage generators $E_1$ and $E_2$ connected across a common conductance load $G_L$ through a susceptance $B_A$ and a conductance $G_1$ respectively. In a functioning model, the two voltage sources $E_1$ and $E_2$ whould be driven from a common signal source (not shown) and the output voltages therefrom would be $V_1$ and $V_2$ respectively, having equal amplitudes and a phase relationship as shown in FIGURE 1. It has been shown that if $G_1 \gg G_L$, and $B_A$ is lossless, the circuit will be all-pass. The susceptance $B_A$ may take any one of a number of forms, such being well known in the art. For a summary of some typical susceptance configurations, see "Designing High-Grade Delay Equalizers" by H. Matthes; NTZ–CJ, 1965, No. 4, pages 177 to 185.

FIGURE 2 illustrates the prior art current dual of the two generator voltage delay equalizer circuit shown in FIGURE 1. FIGURE 2 illustrates two current sources $I_1$ and $I_2$ which are connected in series with a load resistance $R_L$. A reactance $X_A$ is connected across the current source $I_1$ while a resistance $R_1$ is connected across the current source $I_2$. The current outputs from the sources $I_1$ and $I_2$ are $i_1$ and $i_2$ respectively, again having equal amplitude and a phase relationship as shown in FIGURE 2.

In a manner similar to that shown with respect to the circuit of FIGURE 1, it can be shown that if $R_L \ll R_1$, and $X_A$ is lossless, the circuit will be all-pass. However, it can also be shown that if $i_1/i_2=R_1/R_L+R_1)$ the circuit will again be all-pass. The value of the resistance $R_1$ can then be adjusted to give a family of phase delay curves as shown later with respect to FIGURE 6, while the frequency of maximum phase shift can be adjusted by changing the values of the complex reactance $X_A$. In practice, the value of the load resistance $R_L$ must be made fairly high in order to extract power from the circuit. Additionally, the reactance $X_A$ is not lossless. As a result, varying the values of the resistance $R_1$ and the reactance $X_A$ (without changing the relative magnitude and phase of the current generators), will cause the insertion loss to vary with frequency.

FIGURE 3 illustrates the voltage generator version of an active delay equalizer circuit in accordance with the present invention. It comprises the two voltage generators $E_1$ and $E_2$ and a third voltage generator $E_3$. The generators $E_1$ and $E_2$ are each connected across a load admittance $A_L$ through the susceptance $B_A$ and an admittance $A_1$ respectively. In addition, a third generator $E_3$ is connected in series with an additional admittance $A_2$ across the susceptance $B_A$. Preferably, the load admittance $A_L$ and the admittance $A_1$ are conductances which are equivalent to the conductances $G_L$ and $G_1$ shown in FIGURE 1. Also, the admittance $A_2$ should preferably although not necessarily be a conductance. This permits continuously variable phase delay by adjusting a single conductance with virtually no change in the amplitude response.

FIGURE 4 illustrates the current generator version of an active delay equalizer network in accordance with the present invention. It comprises the two current sources $I_1$, $I_2$ and a third current source $I_3$. As in the two generator versions of FIGURE 2, a load impedance $Z_L$ is connected in series with the two current sources $I_1$ and $I_2$. Also, connected in shunt with the current source $I_2$ is an impedance $Z_1$. Preferably, the load impedance $Z_L$ and the impedance $Z_1$ are resistances which are equivalent to the resistances $R_L$ and $R_1$ respectively, in FIGURE 2. The reactance $X_A$, which determines the phase delay, is connected in series with an additional impedance $Z_2$ across the current source $I_1$. Connected in shunt with the impedance $Z_2$ is the third current generator $I_3$.

In FIGURES 3 and 4, there is shown three voltage generators $E_1$, $E_2$ and $E_3$ and three current generators $I_1$, $I_2$ and $I_3$ respectively. In a functioning model, the active delay equalizer circuit would be connected to a single source (not shown). Thus, each of the current generators $I_1$, $I_2$ and $I_3$, and voltage generators $E_1$, $E_2$ and $E_3$, would be driven from a single source. A detailed example will now be given with reference to the following figure.

FIGURE 5 illustrates a schematic circuit diagram of the basic circuit diagram shown in FIGURE 4. Referring to FIGURE 5, the current version of the active delay equalizer circuit comprises an input transformer 10, the primary of which is connected to an alternating current source 11. The secondary of the transformer 10 is tapped with one end being coupled through capacitors 12 and 13 to the emitters of transistors 14 and 15 through attenuation and phase networks 24 and 25 respectively. The other end of the secondary of the transformer 10 is coupled through a capacitor 16 to the emitter of a transistor 17, through an attenuation and phase network 27, such that the signal connected thereto is essentially out of phase with those connected to transistors 14 and 15. The networks 24, 25 and 27 may be required in order to compensate for the effects of stray reactances, so as to maintain the correct amplitude and phase relationships between the generators thus resulting in an all-pass network. Each of the transistors 14, 15 and 17 operates in a grounded base configuration, and is connected to operating voltages through appropriate biasing resistors in a well known manner. The transistors 14, 15 and 17 in conjunction with their biasing resistors form the current generators $I_1$, $I_2$ and $I_3$, respectively shown in FIGURE 4.

The outputs from the collectors of the transistors 14 and 15 are connected through coupling capacitors 20 and 21 across opposite ends of the load impedance $Z_L$. The load impedance $Z_L$ comprises a resistance $R_L$ which is coupled through a transformer 22 that transforms from balanced to unbalanced operation and provides impedance matching.

As in FIGURE 3, the impedance $Z_1$ is connected in shunt with the current source $I_2$. Connected from the common junction of the load impedance $Z_L$ and the output of the current source $I_1$ is the series connected reactance $X_A$ and the impedance $Z_2$ to ground. The output of the current source $I_3$ is connected effectively across the impedance $Z_2$ through coupling capacitor 24. In this embodiment, both impedances $Z_1$ and $Z_2$ are illustrated as variable resistances. Depending upon the amplitude relationship of the current sources $I_1$, $I_2$ or $I_3$ as hereinafter explained, the phase delay of the circuit may be varied by adjusting only one of the two impedances $Z_1$ or $Z_2$. Under such circumstances, the other impedance would be of a fixed predetermined value.

In operation of the circuit of FIGURE 5, a signal from the alternating current source 11 is connected through the transformer 10 and is then coupled through the coupling capacitors 12, 13, and 16 to the respective transistors 14, 15 and 17. The output signals from transistors 14, 15 and 17 are connected across the load impedance $Z_L$. The circuit functions as a bridge circuit with the proportion of signal currents from the transistors 14, 15 and 17 which appear across the load impedance $Z_L$ being determined by the instantaneous impedance of $Z_1$, $Z_2$, $X_A$ and $Z_L$ at a specific input signal frequency from the alternating current source 11.

The reactive network $X_A$, while shown in this embodiment as a simple parallel resonant circuit, may be of a variety of configurations depending upon the desired phase delay characteristic, as hereinbefore explained with reference to the article by Matthes. It can be shown that if the following relationship is maintained, the circuit will be all-pass:

$$\frac{i_2}{i_1}Z_1+\frac{i_3}{i_1}Z_2=Z_1+Z_L+2Z_2$$

where:

$i_1$, $i_2$, and $i_3$ are the amplitudes of the signal currents at the output of the transistors 14, 15 and 17 respectively; and $Z_1$, $Z_2$ and $Z_L$ are the values of the respective impedances.

It is apparent that if $Z_1$, $Z_2$ and $Z_L$ are resistances and $i_1=i_2$, the resistance $Z_1$ cancels out of the above expression. Hence, the resistance of the impedance $Z_1$ may be readily varied, which in turn alters the phase delay characteristic of the circuit, without changing the all-pass characteristic. In the extreme case, when $Z_1=0$, the current generator $I_2$ is shorted out and the circuit functions as a two generator model.

On the other hand, if $Z_1$, $Z_2$ and $Z_L$ are resistive and $2i_1=i_3$, the impedance $Z_2$ cancels out of the above expression. As a result, the resistance $Z_2$ may be varied to change the phase delay of the circuit without altering its all-pass characteristic.

Figure 6:
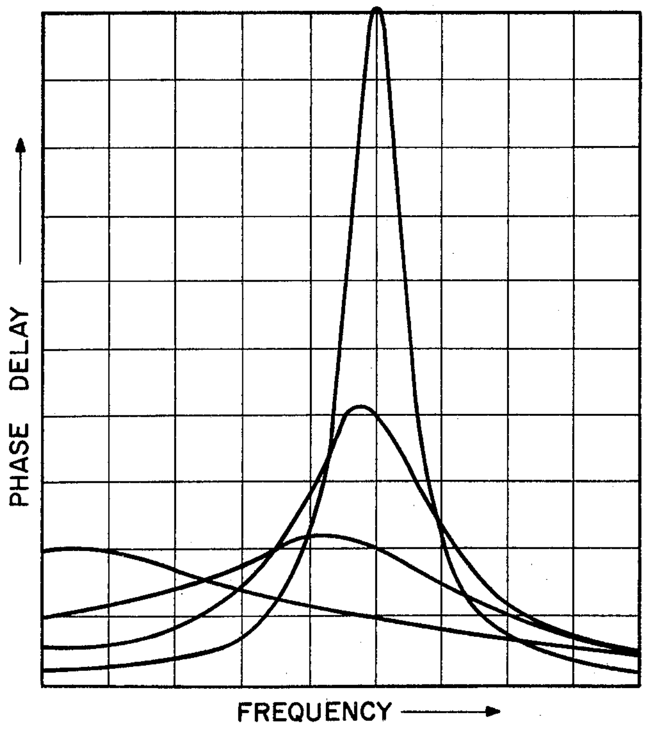
FIGURE 6 is a graph illustrating a family of curves of phase-delay versus frequency for a typical active delay equalizer circuit of the present invention.

As a result, a variable phase delay characteristic as shown in the family of curves of FIGURE 6 (which illustrates phase delay versus frequency) may be readily obtained by varying the resistance of either impedances $Z_1$ or $Z_2$ while maintaining a virtually flat at all-pass frequency characteristic for the circuit. As is well known in the art, it will be necessary to compensate for any stray reactances which would alter the operating characteristic of the various components. However, with the circuit of the present invention, this can be readily achieved with extremely small degradation in the overall performance relative to that which can be obtained theoretically. Thus, with the circuit of the present invention, the phase response of an associated transmission system may be readily equalized by adjustment of a single resistance in the active delay equalizer circuit without virtually any change in the amplitude response.

In a similar manner, it can be shown that the voltage generator version illustrated in FIGURE 3 can be made all-pass if:

$$\frac{V_2}{V_1}A_1+\frac{V_3}{V_1}A_2=(A_1+2A_2+A_L)$$

where:

$V_1$, $V_2$ and $V_3$ are the amplitudes of the signal voltages at the outputs of the generators $E_1$, $E_2$ and $E_3$ respectively, and $A_1$ $A_2$ and $A_L$ are the values of the respective admittances.

It is apparent that if $A_1$, $A_2$, and $A_L$ are conductances and $V_2=V_1$, the conductance $A_1$ cancels out of the above expression. Hence the conductance $A_1$ may be varied so as to alter the phase delay without changing the all-pass characteristic. In the extreme case, when $Z_1=0$, the curthe voltage generator $E_2$ is open circuited and the circuit functions as a two generator model.

On the other hand, if $A_1$, $A_2$ and $A_L$ are conductances and $V_3=2V_1$, the conductance $A_2$ cancels out of the above expression. As a result, the conductance $A_2$ may be varied to change the phase delay of the circuit without altering its all-pass characteristic.

What is claimed is:

1. An active delay equalizer circuit comprising: first, second and third current amplifiers each having an input, an output and a common connection; each of the input and common connections adapted to be connected to a source of signal current;
   a first and a second impedance connected between the output and common connections of the second and third current amplifiers respectively;
   a reactance connected between the output connections of the first and the third current amplifiers; and:
   a load impedance connected between the output connections of the first and the second current amplifiers; such that:

$$\frac{i_2}{i_1}Z_1+\frac{i_3}{i_1}Z_2=Z_1+Z_L+2Z_2$$

where:
$i_1$, $i_2$, and $i_3$ are the signal currents at the outputs of the first, second and third current amplifiers respectively; $Z_1$ and $Z_2$ are the impedances of said first and second impedances respectively; and $Z_L$ is the impedance of of said load impedance.

2. A circuit as defined in claim 1 in which $Z_1$, $Z_2$ and $Z_L$ are resistive, and $2i_1=i_3$, whereby the resistive imance $Z_1$ may be varied to change the phase delay.

3. A circuit as defined in claim 1 in which $Z_1$, $Z_2$ and $Z_L$ are resistive, and $2i_1=i_3$, whereby the resistive impedance $Z_2$ may be varied to change the phase delay.

4. An active delay equalizer circuit comprising:
   first, second and third voltage amplifiers, each having a pair of input connections and a pair of output connections, means for connecting each of said pairs of input connections to a source of signal voltage;
   a susceptance and a load admittance serially connected across the pair of output connections of the first voltage amplifier;
   a first admittance connected in series with the output connections of the second voltage amplifier across the load admittance; and
   a second admittance connected in series with the output connections of the third voltage amplifier across the susceptance; such that:

$$\frac{V_2}{V_1}A_1+\frac{V_3}{V_1}A_2=(A_1+2A_2+A_L)$$

where:
$V_1$, $V_2$ and $V_3$ are the signal voltage across the outputs of the first, second and third voltage amplifiers respectively; and $A_1$ and $A_2$ are the admittances of said first and second admittances respectively; and $A_L$ is the admittance of said load admittance.

5. A circuit as defined in claim 4 in which $A_1$, $A_2$ and $A_L$ are conductances and $V_1=V_2$, whereby the conductance $A_1$ may be varied to change the phase delay.

6. A circuit as defined in claim 4 in which $A_1$, $A_2$ and $A_L$ are conductances and $V_3=+2V_1$ whereby the conductance $A_2$ may be varied to change the phase delay.

References Cited

UNITED STATES PATENTS 3,336,539 8/1967 Kwartiroff et al. ---- 333—28 X

ROY LAKE, Primary Examiner

L. J. DAHL, Assistant Examiner

U.S. Cl. X.R.

333—28